(12) United States Patent
Kirchenwitz

(10) Patent No.: US 7,108,333 B1
(45) Date of Patent: Sep. 19, 2006

(54) SYSTEM FOR MOUNTING TRACKS ON A WHEEL OF A VEHICLE

(76) Inventor: Ron A. Kirchenwitz, 1956 Hazen St., Shakopee, MN (US) 55379

( * ) Notice: Subject to any disclaimer, the term of this patent is extended or adjusted under 35 U.S.C. 154(b) by 109 days.

(21) Appl. No.: 10/833,834

(22) Filed: Apr. 28, 2004

(51) Int. Cl.
*B25B 27/14* (2006.01)

(52) U.S. Cl. ............... 301/35.627; 29/273; 305/60

(58) Field of Classification Search .......... 301/35.627; 29/271, 273; 305/60
See application file for complete search history.

(56) References Cited

U.S. PATENT DOCUMENTS

| | | | | |
|---|---|---|---|---|
| 1,511,463 | A | * | 10/1924 | Griffith, Jr. .................. 29/273 |
| 2,896,315 | A | * | 7/1959 | Dubberke .................... 29/428 |
| 3,319,327 | A | * | 5/1967 | Dombeck .................... 29/273 |
| 3,348,294 | A | * | 10/1967 | Gerardi ....................... 29/273 |
| 3,937,263 | A | | 2/1976 | Hill et al. |
| 4,487,314 | A | | 12/1984 | Stewart |
| 4,513,800 | A | | 4/1985 | Vossenkemper |
| 4,883,371 | A | | 11/1989 | Matsumoto |
| 5,581,866 | A | * | 12/1996 | Barkus ........................ 29/273 |
| 5,641,213 | A | | 6/1997 | Arsenault |
| 5,938,301 | A | | 8/1999 | Hostetler et al. |
| 6,062,662 | A | | 5/2000 | Witt |
| 6,203,127 | B1 | | 3/2001 | Chapman |
| 6,263,554 | B1 | | 7/2001 | Lyne, Jr. |
| 6,371,578 | B1 | | 4/2002 | Ferguson |

* cited by examiner

*Primary Examiner*—Russell D. Stormer
(74) *Attorney, Agent, or Firm*—Jeffrey A. Proehl; Woods Fuller Shultz & Smith PC

(57) ABSTRACT

A wheel mounting apparatus is disclosed for mounting a wheel carrying a track onto a vehicle. The wheel mounting apparatus comprises a mounting structure for mounting onto an axle of the vehicle. The mounting structure is removably mountable to the axle of the vehicle. The wheel mounting apparatus also includes an aligning structure for aligning the wheel with an end of an axle of the vehicle for permitting mounting of the wheel on the axle. The aligning structure is coupled to the mounting structure.

22 Claims, 7 Drawing Sheets

SYSTEM FOR MOUNTING TRACKS ON A WHEEL OF A VEHICLE

BACKGROUND OF THE INVENTION

1. Field of the Invention

The present invention relates to track mounting systems and more particularly pertains to a new system for mounting tracks on a wheel of a vehicle for facilitating and expediting the mounting of the wheel on the vehicle when the wheel must be mounted against and in spite of the tension being applied to the wheel by the track.

2. Description of the Prior Art

The use of tracked vehicles for traversing areas of ground where the soil is loose or extra traction is needed is well known. However, wheeled vehicles such as skid steer utility vehicles or loaders have become popular for projects. However, these wheeled vehicles often traverse ground that is not solid, and thus it has become desirable to mount tracks on the skid steer loaders, and in particular to mount the tracks directly on the wheels of the loader so that virtually nothing more than the track is needed to convert the loader from a wheeled configuration to a tracked configuration. Often the tracks that are employed on the skid steer loaders are formed of an elastomeric and stretchable material so that the tracks are under a degree of tension when they are mounted on the wheels of the loader. This can make the mounting of the tracks on the wheel difficult, as this often requires the track to have a break therein that forms ends that must be brought together against the tension in the elastomeric material in order to mount the tracks.

Even the installation of one-piece or endless tracks presents a challenge, as the track is typically wrapped about a mounted tire and an unmounted tire on a side of the skid steer loader, and the unmounted tire then must be installed on the hub of the axle of the loader while a portion of the track is wrapped about it. Even when the tires of the wheels are partially deflated, the tension present in the elastomeric track can make the alignment of the lug holes of the wheel rim with the lug bolts on the hub of the axle while mounting the wheel difficult, if not virtually impossible, without significant exertion and multiple persons.

In these respects, the system for mounting tracks on a wheel of a vehicle according to the present invention substantially departs from the conventional concepts and designs of the prior art, and in so doing provides an apparatus primarily developed for the purpose of facilitating and expediting the mounting of the wheel on the vehicle when the wheel must be mounted against and in spite of the tension being applied to the wheel by the track.

SUMMARY OF THE INVENTION

In view of the foregoing disadvantages inherent in the known types of track mounting systems now present in the prior art, the present invention provides a new system for mounting tracks on a wheel of a vehicle wherein the same can be utilized for facilitating and expediting the mounting of the wheel on the vehicle when the wheel must be mounted against and in spite of the tension being applied to the wheel by the track.

To attain this, the present invention generally comprises a wheel mounting apparatus for mounting a wheel carrying a track onto a vehicle. The wheel mounting apparatus comprises a mounting structure for mounting onto an axle of the vehicle. The mounting structure is removably mountable to the axle of the vehicle. The wheel mounting apparatus also includes an aligning structure for aligning the wheel with an end of an axle of the vehicle for permitting mounting of the wheel on the axle. The aligning structure is coupled to the mounting structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is that a single person may be able to mount a wheel on a vehicle while the track is wrapped about the wheel in a manner that is faster and easier than known methods of mounting tracked wheels on a vehicle.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
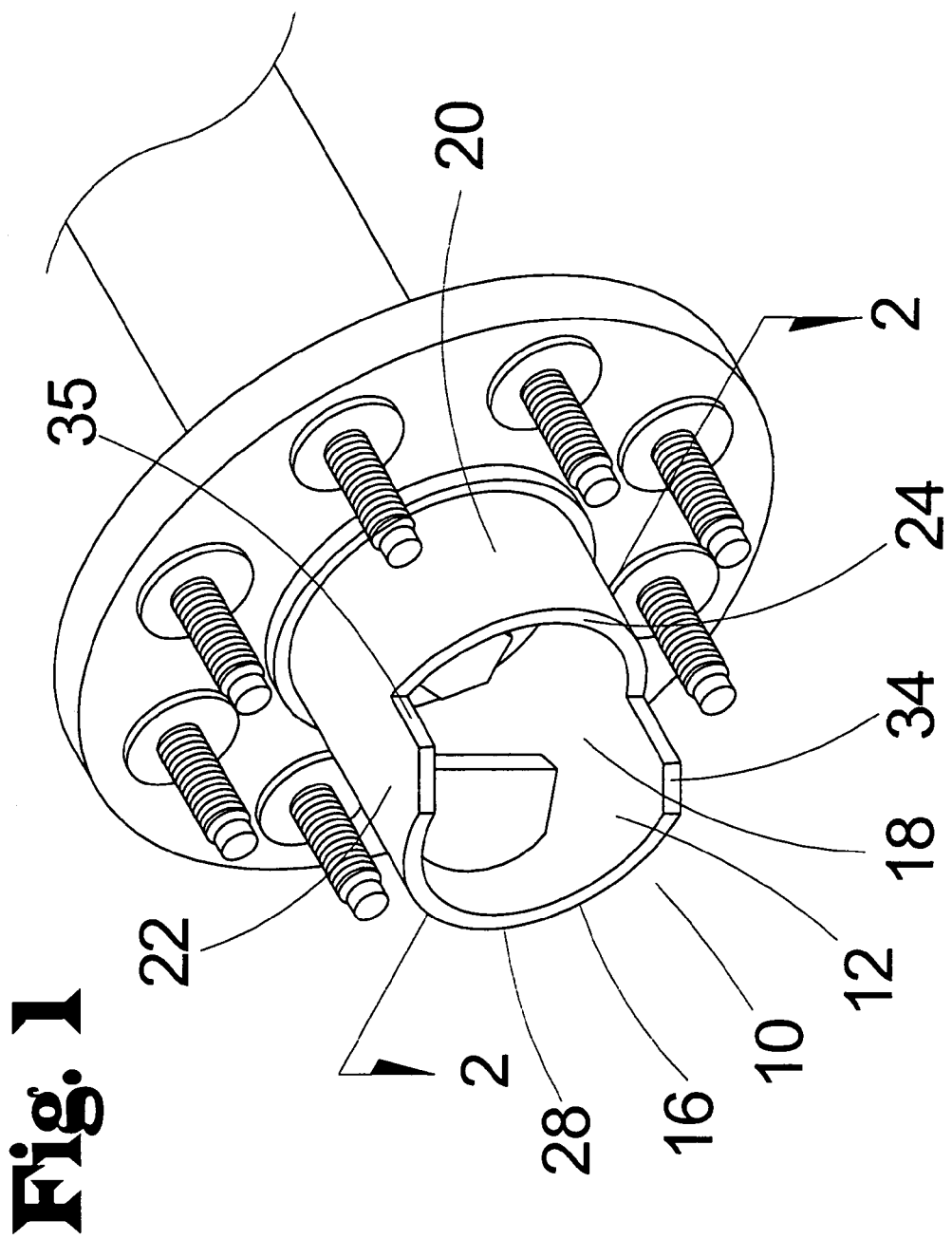
FIG. 1 is a schematic perspective view of the wheel mounting apparatus of a new system for mounting tracks on a wheel of a vehicle according to the present invention in position for use on the hub of an axle of a vehicle.
Figure 2:
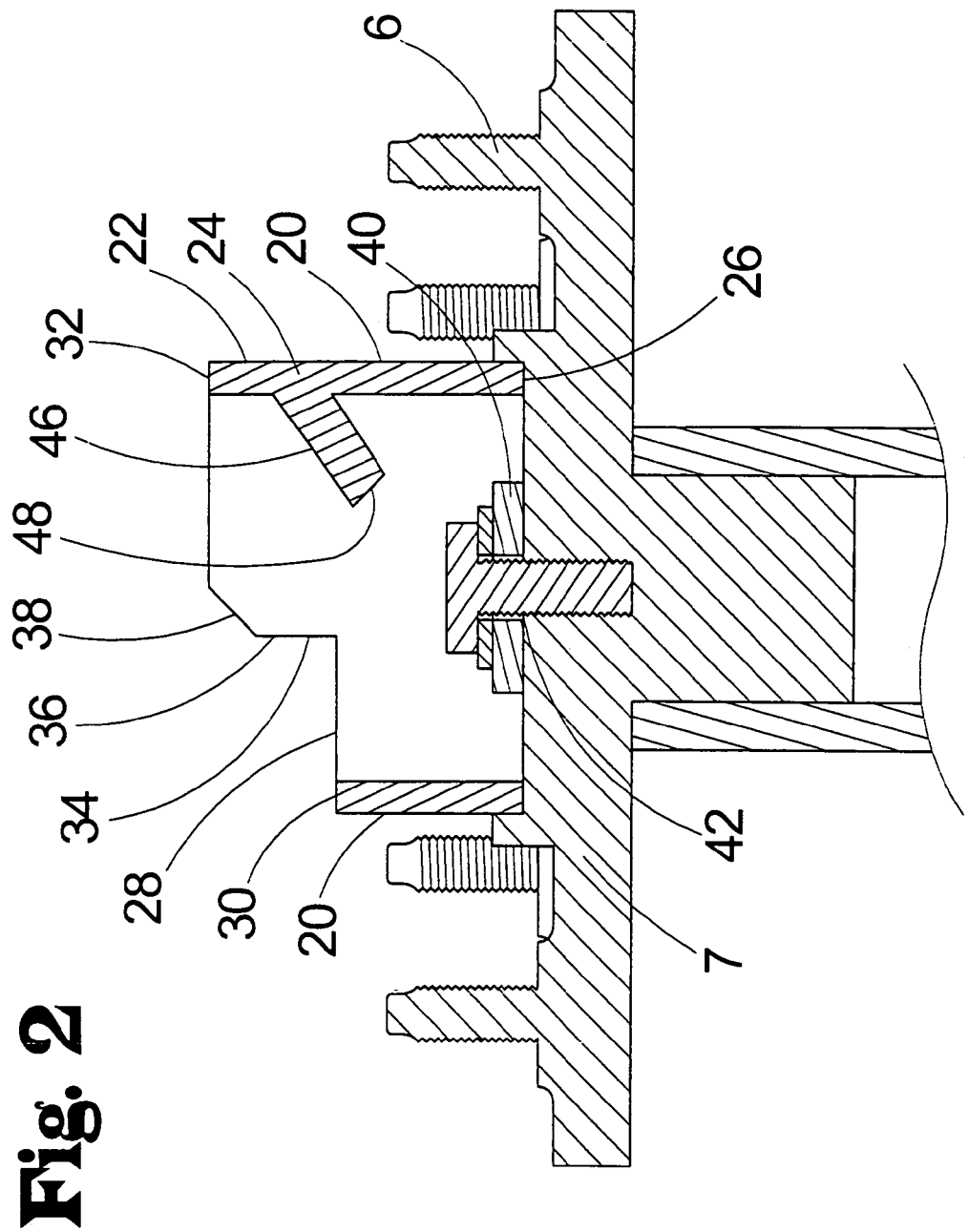
FIG. 2 is a schematic sectional view of the wheel mounting apparatus of the present invention taken along line 2—2 of FIG. 1.
Figure 3:
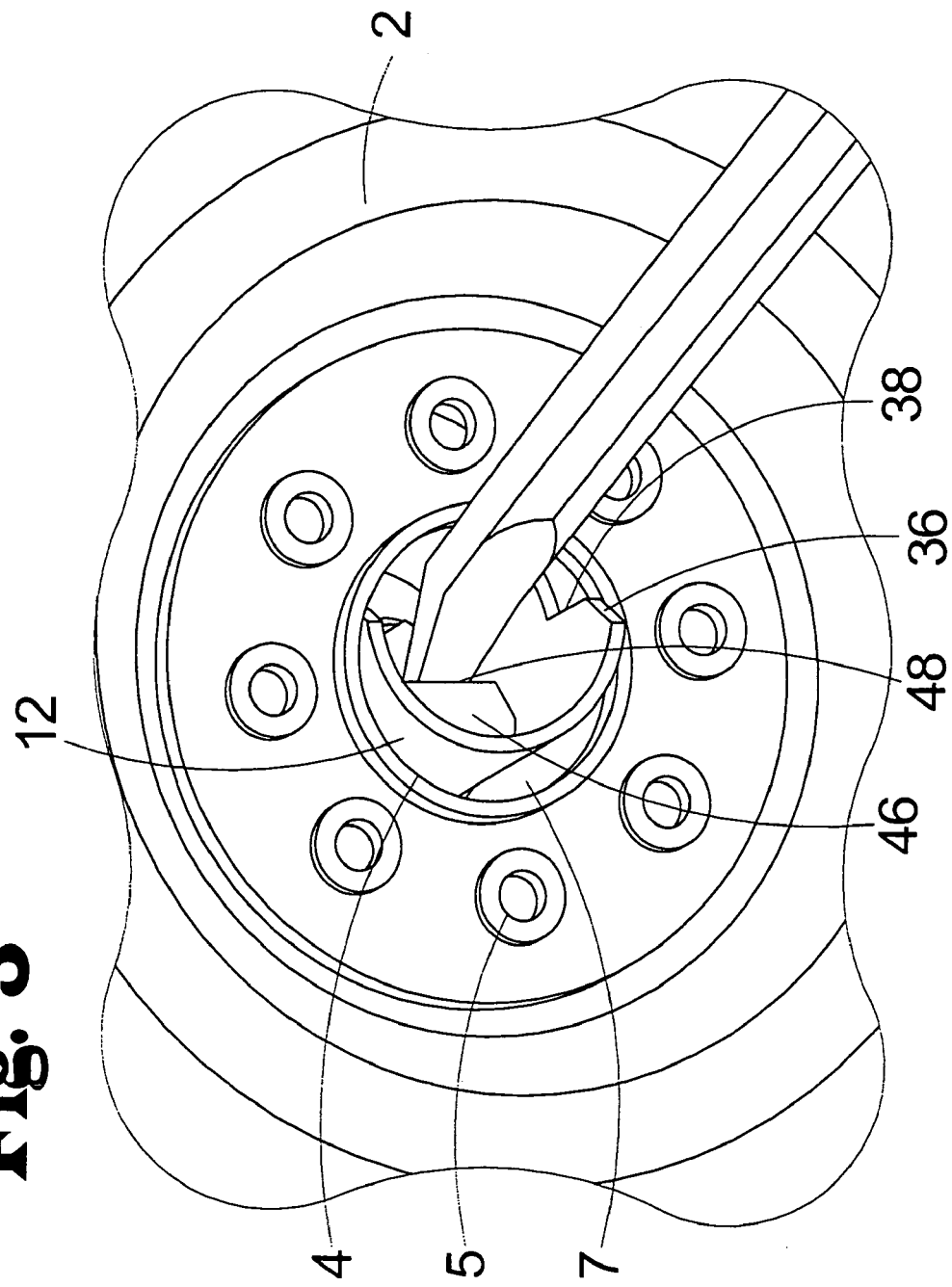
FIG. 3 is a schematic perspective view of the wheel mounting apparatus of the present invention in an initial rotational position while a levering device is positioned against the wheel mounting apparatus to use the apparatus as a fulcrum to guide the wheel onto the apparatus.
Figure 4:
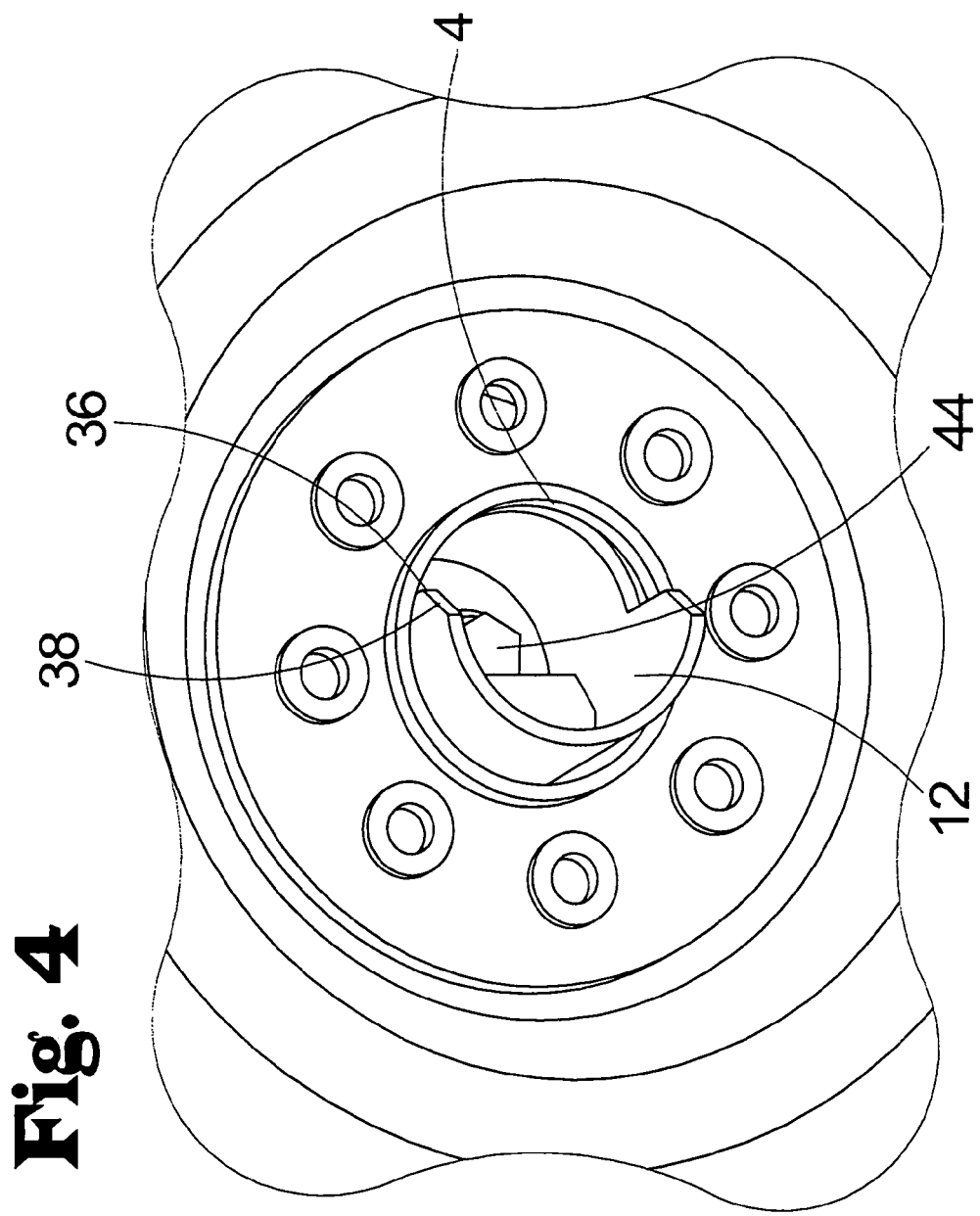
FIG. 4 is a schematic perspective view of the wheel mounting apparatus of the present invention in the initial rotational position and located in the central opening of the wheel.
Figure 5:
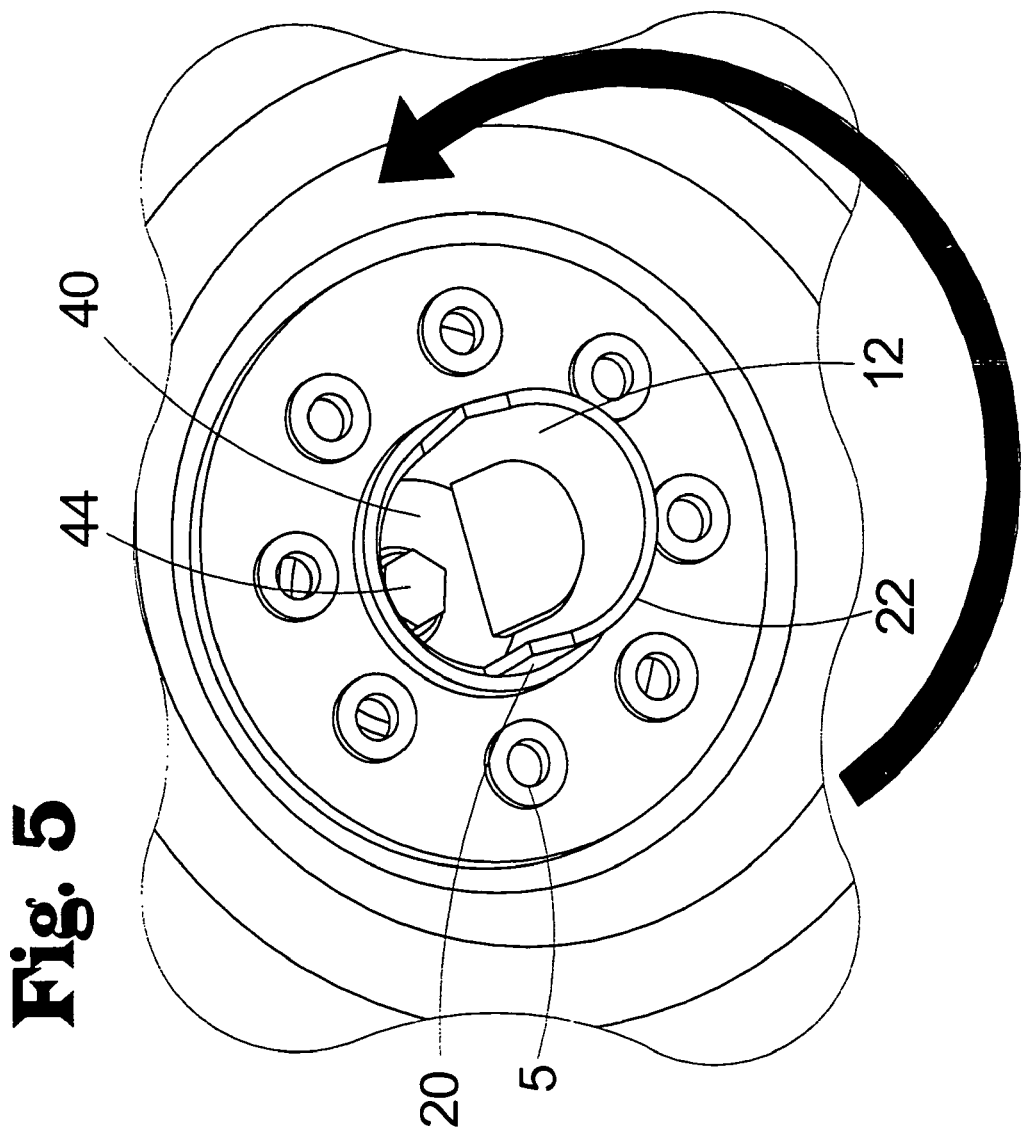
FIG. 5 is a schematic perspective view of the wheel mounting apparatus of the present invention in an intermediate rotational position.
Figure 6:
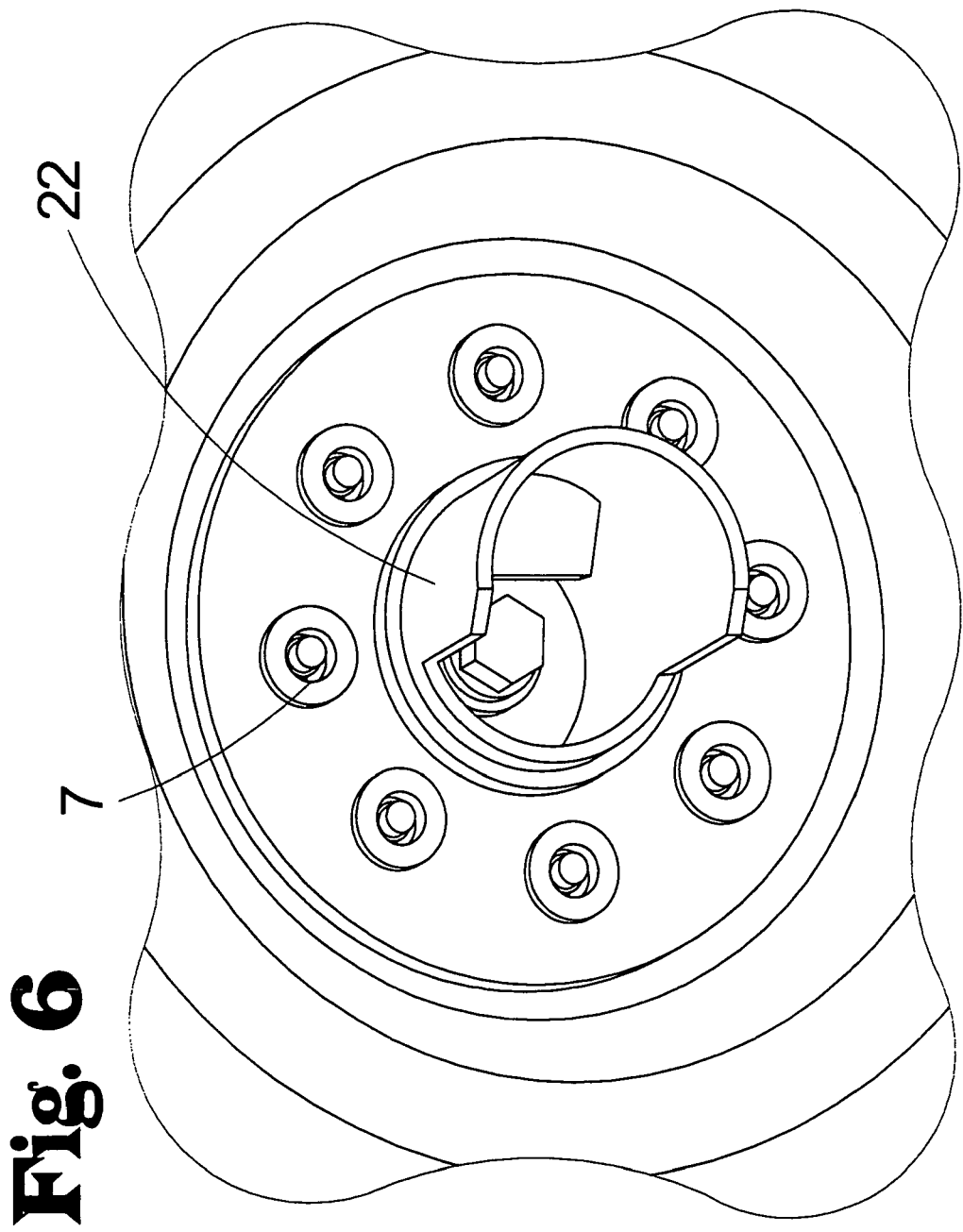
FIG. 6 is a schematic perspective view of the wheel mounting apparatus of the present invention in a final rotational position.
Figure 7:
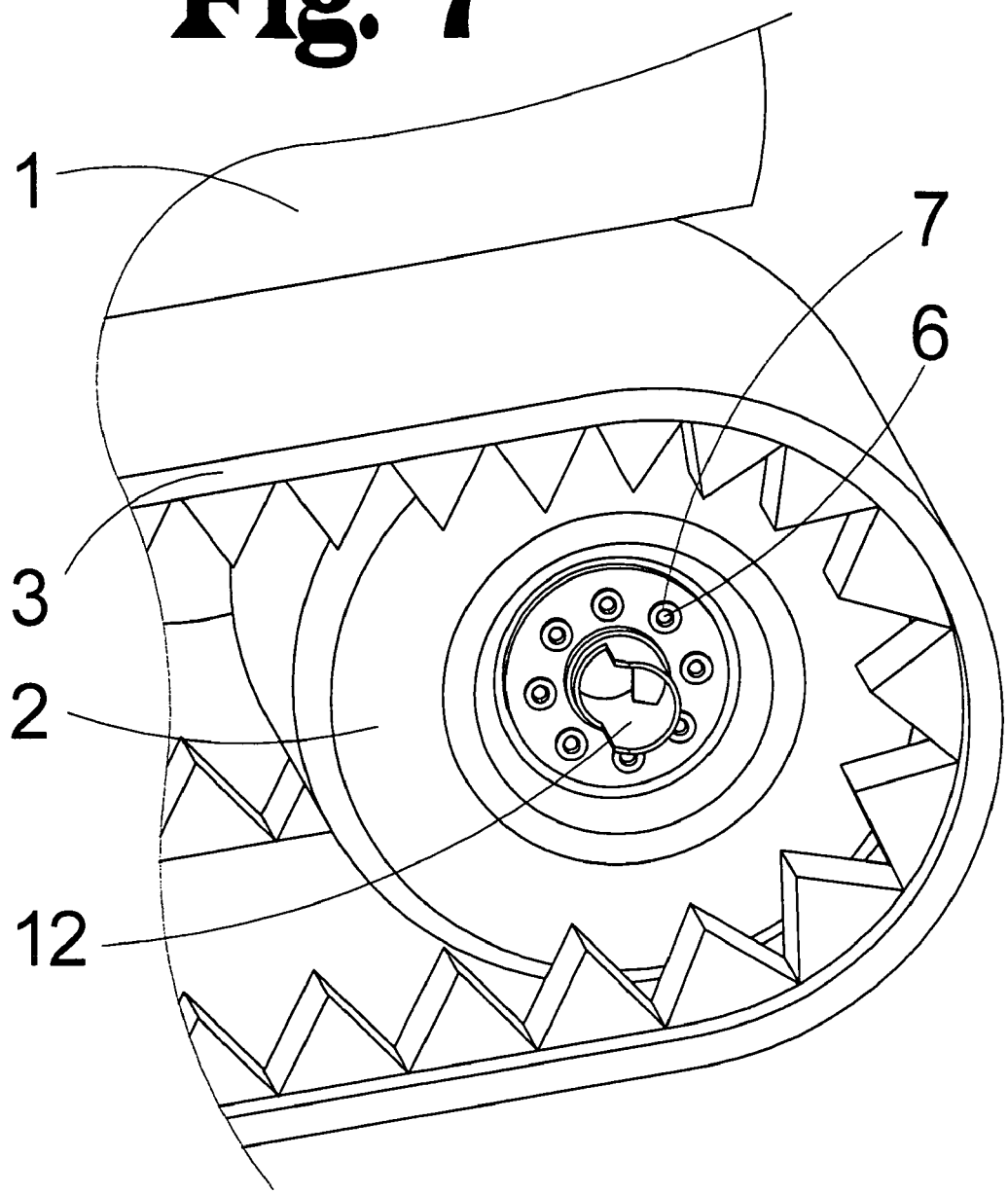
FIG. 7 is a schematic perspective view of the wheel mounting apparatus of the present invention with the apparatus in a final rotational position and the wheel moved inward toward the hub so that the lug bolts are positioned in the lug holes of the wheel.

With reference now to the drawings, and in particular to FIGS. 1 through 7 thereof, a new system for mounting tracks on a wheel of a vehicle embodying the principles and concepts of the present invention and generally designated by the reference numeral 10 will be described.

The wheel mounting apparatus 10 of the invention is highly suitable for facilitating the mounting of a wheel onto a vehicle while the wheel carries a track or a portion of the track is wrapped about the wheel. In one embodiment of the invention, the vehicle is a skid steer loader 1 with wheels, and generally includes a pair of front wheels 2 and a pair of rear wheels 2. A track 3 may be mounted on the front and rear wheels of a side of the skid steer loader 1 with each of the tracks being placed under a degree of tension in order to help keep the track in proper alignment on the wheels. Each of the wheels 2 typically has a central opening 4 for aligning with a center of a hub of the axle of the loader, and a plurality of lug-receiving holes 5 positioned about the central opening for receiving studs or lug bolts 6 that mount the wheel to the axle hub 7. Due to the tension applied by the track 3 to the wheel 2 when the track is mounted about the wheel, the task of aligning the central opening 4 of the wheel 2 with the hub 7 of the axle, and aligning the plurality of holes 5 with the lug bolts 6 of the hub 7, is made more difficult.

The wheel mounting apparatus 10 of the invention may include means for aligning the wheel with an end or hub of the axle of the vehicle to permit mounting of the wheel on the hub of the axle, and means for mounting the aligning means onto an axle of the vehicle. The aligning means may be coupled to the mounting means such that the mounting means is capable of removably and temporarily mounting the aligning means on the axle during the operation of mounting the wheel onto the hub, and then may be removed from the hub until the next mounting (or even dismounting) operation.

In the illustrative embodiment of the invention, the aligning means comprises an alignment member 12 for positioning adjacent to the axle of the vehicle. The alignment member 12 may have a first end 14 and a second end 16, with the first end being positionable adjacent to the hub 7 of the axle during use such that the second end extends away from the hub. The alignment member 12 may have an interior cavity 18, which may extend into the alignment member from the second end 16 toward the first end 14, and may extend completely through the alignment member 12 from the first end 14 to the second end 16.

The alignment member 12 may have a primary perimeter surface 20, and the primary perimeter surface may be substantially cylindrical in shape. The primary perimeter surface 20 may have a central axis which may be oriented substantially parallel to a longitudinal axis of the axle of the vehicle when the alignment member is positioned by the mounting means on the hub 7 of the vehicle for use.

The alignment member 12 may have an alignment surface 22, which may form an extension of a portion of the primary perimeter surface 20 in an axial or longitudinal direction. The portion of the primary perimeter surface 20 along which the alignment surface 22 extends is between approximately 160 degrees and approximately 200 degrees about the central axis of the primary perimeter surface, and in one preferred embodiment of the invention extends from about 180 degrees of the cylindrical primary perimeter surface.

In one preferred embodiment of the invention, the alignment member 12 comprises a tubular wall 24 with the primary perimeter surface 20 and the alignment surface 22 formed thereon.

The alignment member 12 may have an inboard edge 26 at the first end 14 thereof and an outboard edge 28 at the second end 16 thereof. The inboard edge 26 may be continuous and circular and lie in a single plane. The outboard edge 28 may have a first portion 30 at a first distance from the inboard edge 26 and a second portion 32 at a second distance from the inboard edge. The first distance may be greater than the second distance. The first portion 30 may be positioned along the primary perimeter surface 20 and the second portion 32 may be located along the alignment surface 22. The outboard edge 28 may include a pair of transition portions 34, 35 that extend between the first 30 and second 32 portions of the outboard edge. Each of the transition portions 34, 35 of the outboard edge 28 may have a first section 36 that is oriented substantially parallel to the central axis of the primary perimeter surface 20 and a second section 38 that is oriented in a skewed orientation to the first section 36 of the transition portion 34 and the first 30 and second 32 portions of the outboard edge 28.

The mounting means may be removably mountable to the hub 7 of the axle of the vehicle 1 to thereby removably mount the alignment member 12 on the hub 7. The mounting means may comprise a mounting member 40 mounted on the alignment member 12. The mounting member 40 may have an aperture 42 formed therein for aligning with a fastener-receiving channel in the hub 7 of the axle of the vehicle. The aperture 42 may have a center that is slightly offset from a center of curvature of the primary perimeter surface 20 to enhance the camming action describe below.

The mounting means may also include a mounting fastener 44 for mounting the alignment member 12 to the hub 7 of the vehicle. The mounting fastener 44 may extend through the aperture 42 of the mounting member 40 into the channel in the hub. In one embodiment of the invention, the mounting fastener 44 comprises a bolt. It should be recognized that the mounting fastener 44 may comprise a fastener that is part of the original equipment (OEM) hub of the axle that can be removed and reinstalled with the invention held in place on the hub 7 by the OEM fastener.

The wheel mounting apparatus 10 may also include a fulcrum member 46 mounted on the alignment member 12 for providing a fulcrum for a lever, such as a crow bar or wrecking bar. The fulcrum member 46 may be positioned in the interior cavity 18 of the alignment member 12. The fulcrum member 46 may extend from the alignment member 12 inwardly in the interior cavity 18 such that a free end 48 of the fulcrum member is positioned toward the center of the alignment member 12. The fulcrum member 46 may comprising a substantially planar plate positioned in a plane oriented skewed to the central axis of the primary perimeter surface 20.

In use, one of the wheels 2 on a side of the vehicle 1 is removed, if it has not already been removed, and the vehicle is suitably jacked or supported to avoid tipping or other undesirable movement. Preferably, the rear wheel 2 on a side is removed, as the power of the vehicle is typically applied at least to the rear wheel. The alignment member 12 is attached to the hub 7 using the mounting fastener 44 passing through the aperture 42 and into a threaded channel in the hub 7. In one embodiment of the invention, a fastener and washer that is originally equipped with the hub 7 of the vehicle may be removed from the hub 7 and reinstalled on the hub 7 with the mounting member 40 mounted thereon.

The alignment member 12 is positioned with the first portion 30 of the outboard edge 28 positioned away from the mounted wheel and the second portion 32 of the outboard edge positioned toward the dismounted wheel. This positioning may be accomplished by the mounting of the alignment member 12 or by rotating the axle and hub 7 of the vehicle once the member 12 is mounted.

The mounted wheel is positioned in the interior of the loop formed by the track 3, and the dismounted wheel is positioned inside the loop. The dismounted wheel is positioned adjacent to the hub 7 of the axle of the vehicle 1.

A crow bar or other levering device may be inserted through the central opening 4 of the wheel and an end of the levering device is positioned against a portion of the wheel mounting apparatus 10, such as the fulcrum member 46. The levering device is pivoted such that the levering device moves away from the mounted wheel. As the levering device pivots past the alignment member 12, the dismounted wheel slides along the levering device and moves toward the alignment member 12. The edge of the central opening 4 is lodged on the transition portions 34, 35 of the outboard edge, and on the first section 38 of the transition portion. The dismounted wheel is held against the first section 38 of the transition portions 34, 35 of the outboard edge 28 by the tension in the track once the levering device is removed from the wheel and the fulcrum member 46.

The axle and hub 7 of the vehicle is then rotated approximately 180 degrees so that the first portion 30 of the outboard edge 28 is positioned toward the mounted wheel and the second portion 32 of the outboard edge is positioned away from the mounted wheel. This movement moves the edge of the central opening off of the transition portions 34, 35 of the outboard edge and onto the alignment surface of the alignment member in a kind of a camming movement, which has the effect of stretching the track and moving the wheel into a centered position on the hub with the lug-receiving holes 5 of the wheel 2 aligned or easily alignable with the lug bolts or studs of the hub 7 of the axle. The wheel may then be moved inwardly toward the hub 7 so that the lug bolts 6 move into the lug receiving holes 5 of the hub 7, and the lug nuts can be mounted on the lug bolts. This may be accomplished by sliding the edge of the central opening over the alignment surface, over the primary perimeter surface, and into a position receiving the lugs.

The wheel mounting apparatus 10 may then be removed from the hub 7 of the vehicle until the next time that the wheel needs to be mounted or dismounted from the vehicle 1.

In one illustrative embodiment of the invention, the alignment member is formed from an approximately 5.5 inch (outside diameter) metal pipe that is approximately 4 inches in length. The approximately 4 inch length is reduced by approximately 1.25 inches over approximately one half of the circumference of the pipe, so that the wall for approximately one half of the circumference is approximately 4 inches and for the other approximately one half of the circumference is approximately 2.75 inches.

It should be noted that the usefulness of the invention is not limited to endless tracks or elastomeric tracks, as even tracks that comprise a plurality of segments, tracks with a break formed therein, or tracks that are not formed of an elastomeric may be configured in a loop and installed using the disclosed apparatus and method.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheel mounting apparatus for mounting a wheel carrying a track onto a vehicle, the wheel mounting apparatus comprising:
   mounting means for mounting onto an axle of the vehicle, the mounting means being removably mountable to the axle of the vehicle; and
   aligning means for aligning the wheel with an end of an axle of the vehicle for permitting mounting of the wheel on the axle, the aligning means being coupled to the mounting means;
   wherein the aligning means comprises an alignment member for positioning adjacent to the axle of the vehicle, the alignment member having a first end and a second end, the first end being positionable adjacent to the axle of the vehicle such that the second end extends away from the axle of the vehicle; and
   wherein the mounting means comprises a mounting member mounted on the alignment member, the mounting member having an aperture formed therein.

2. The wheel mounting apparatus of claim 1 wherein the aligning means is capable of aligning lug holes on the wheel with lugs on the axle of the vehicle.

3. The wheel mounting apparatus of claim 1 wherein the alignment member has an interior cavity.

4. The wheel mounting apparatus of claim 1 wherein the alignment member has a primary perimeter surface.

5. The wheel mounting apparatus of claim 4 wherein the primary perimeter surface is substantially cylindrical, the primary perimeter surface having a central axis, the central axis being oriented substantially parallel to a longitudinal axis of the axle of the vehicle when the mounting means is mounted on the axle of the vehicle.

6. The wheel mounting apparatus of claim 4 wherein the alignment member has an alignment surface, the alignment surface forming an extension of a portion of the primary perimeter surface in an axial direction.

7. The wheel mounting apparatus of claim 6 wherein the portion of the primary perimeter surface along which the alignment surface extends is between approximately 160 degrees and approximately 200 degrees about the central axis of the primary perimeter surface.

8. The wheel mounting apparatus of claim 1 wherein the alignment member comprises a tubular wall.

9. The wheel mounting apparatus of claim 8 wherein the primary perimeter surface and the alignment surface are formed on the tubular wall.

10. The wheel mounting apparatus of claim 1 wherein the alignment member has an inboard edge and an outboard edge, the inboard edge being continuous.

11. The wheel mounting apparatus of claim 1 wherein the alignment member has an inboard edge and an outboard edge, the outboard edge having a first portion at a first distance from the inboard edge and a second portion at a second distance from the inboard edge, the first distance being greater than the second distance.

12. The wheel mounting apparatus of claim 11 wherein the outboard edge of the alignment member includes a pair of transition portions extending between the first and second portions, each of the transition portions of the outboard edge having a first section being oriented substantially parallel to a central axis of the primary perimeter surface and a second section oriented in a skewed orientation to the first section of the transition portion and the first and second portions of the outboard edge.

13. The wheel mounting apparatus of claim 1 wherein the alignment member has an inboard edge and an outboard edge, the alignment member having a primary perimeter surface and an alignment surface, the first portion of the outboard edge being positioned along the primary perimeter surface and the second portion being located along the alignment surface.

14. The wheel mounting apparatus of claim 1 wherein the aperture of the mounting member has a center that is slightly offset from a center of curvature of a primary perimeter surface of the alignment member.

15. The wheel mounting apparatus of claim 1 additionally comprising a fulcrum member mounted on the alignment member for providing a fulcrum for a lever.

16. The wheel mounting apparatus of claim 15 wherein the fulcrum member is positioned in an interior cavity of the alignment member.

17. The wheel mounting apparatus of claim 16 wherein the fulcrum member extends from the alignment member inwardly in the interior cavity.

18. The wheel mounting apparatus of claim 1 wherein the aligning means is capable of aligning lug holes on the wheel with lugs on the axle of the vehicle;
    wherein the alignment member having an interior cavity;
    wherein the alignment member has a primary perimeter surface;
    wherein the primary perimeter surface is substantially cylindrical, the primary perimeter surface having a central axis, the central axis being oriented substantially parallel to a longitudinal axis of the axle of the vehicle when the mounting means is mounted on the axle of the vehicle;
    wherein the alignment member has an alignment surface, the alignment surface forming an extension of a portion of the primary perimeter surface in an axial direction;
    wherein the portion of the primary perimeter surface along which the alignment surface extends is between approximately 160 degrees and approximately 200 degrees about the central axis of the primary perimeter surface;
    wherein the alignment member comprises a tubular wall;
    wherein the primary perimeter surface and the alignment surface are formed on the tubular wall;
    wherein the alignment member has an inboard edge and an outboard edge, the inboard edge being continuous;
    wherein the outboard edge has a first portion at a first distance from the inboard edge and a second portion at a second distance from the inboard edge, the first distance being greater than the second distance;
    wherein the first portion of the outboard edge is positioned along the primary perimeter surface and the second portion being located along the alignment surface;
    wherein the outboard edge of the alignment member includes a pair of transition portions extending between the first and second portions, each of the transition portions of the outboard edge having a first section being oriented substantially parallel to a central axis of the primary perimeter surface and a second section oriented in a skewed orientation to the first section of the transition portion and the first and second portions of the outboard edge;
    wherein the aperture of the mounting member has a center that is slightly offset from a center of curvature of the primary perimeter surface of the alignment member; and
    a fulcrum member mounted on the alignment member for providing a fulcrum for a lever, wherein the fulcrum member is positioned in the interior cavity of the alignment member, wherein the fulcrum member extends from the alignment member inwardly in the interior cavity.

19. A method of mounting a wheel carrying a track onto a vehicle comprising:
    providing a wheel mounting apparatus comprising mounting means for mounting onto an axle of the vehicle and aligning means for aligning the wheel with an end of an axle of the vehicle for permitting mounting of the wheel on the axle, the aligning means being coupled to the mounting means;
    mounting the wheel mounting apparatus on the end of the axle of the vehicle;
    positioning the wheel inside the track;
    inserting a levering device through a central opening in the wheel;
    using the wheel mounting apparatus as a fulcrum to pivot the levering device with respect to the wheel mounting device; and
    sliding the wheel over the wheel mounting apparatus such that the wheel mounting apparatus extends through the central opening of the wheel; and
    resting an edge defining the central opening of the wheel on a pair of transition portions of an outboard edge of the wheel mounting apparatus, the transition portions of the outboard edge of the wheel mounting apparatus being oriented substantially parallel to a longitudinal axis of the axle of the vehicle.

20. The method of claim 19 additionally comprising the step of rotating the axle of the vehicle when the wheel mounting apparatus is inserted through the central opening of the wheel.

21. A wheel mounting apparatus for mounting a wheel carrying a track onto a vehicle, the wheel mounting apparatus comprising:
    an alignment member for insertion into a central opening of the wheel to align the wheel with an end of an axle of the vehicle, the alignment member having a first end and a second end, the first end being positionable adjacent to the axle of the vehicle such that the second end extends away from the axle of the vehicle, the first end defining a cavity;
    a fulcrum member being positioned in the cavity of the alignment member; and
    a mounting member for removably mounting onto an axle of the vehicle, the mounting member being coupled to the alignment member at the first end of the alignment member, the mounting member having an aperture formed therein.

22. The wheel mounting apparatus of claim 21 wherein the alignment member has an inboard edge for orienting toward the axle and an outboard edge for orienting away from the axle, the outboard edge of the alignment member including a pair of transition portions, the transition portions of the outboard edge alignment member being oriented substantially parallel to a longitudinal axis of the axle when mounted on an axle.

* * * * *